United States Patent
Sakanobe et al.

(10) Patent No.: US 12,173,944 B2
(45) Date of Patent: Dec. 24, 2024

(54) REFRIGERATING AND AIR-CONDITIONING APPARATUS

(71) Applicant: MITSUBISHI ELECTRIC CORPORATION, Tokyo (JP)

(72) Inventors: Kazunori Sakanobe, Tokyo (JP); Kenta Yuasa, Tokyo (JP); Yasuhiko Wada, Tokyo (JP); Chitose Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 196 days.

(21) Appl. No.: 18/003,172

(22) PCT Filed: Aug. 21, 2020

(86) PCT No.: PCT/JP2020/031592
§ 371 (c)(1),
(2) Date: Dec. 23, 2022

(87) PCT Pub. No.: WO2022/038764
PCT Pub. Date: Feb. 24, 2022

(65) Prior Publication Data
US 2023/0251014 A1 Aug. 10, 2023

(51) Int. Cl.
*F25B 49/02* (2006.01)
*F24F 11/41* (2018.01)
(Continued)

(52) U.S. Cl.
CPC ............ *F25B 49/025* (2013.01); *F24F 11/41* (2018.01); *F25B 47/025* (2013.01); *F25B 13/00* (2013.01);
(Continued)

(58) Field of Classification Search
CPC ........ F24F 11/41; F25B 47/025; F25B 49/025; F25B 2347/02; F25B 2600/021; F25B 5700/21152
See application file for complete search history.

(56) References Cited

U.S. PATENT DOCUMENTS

2021/0164715 A1    6/2021 Nishiyama et al.

FOREIGN PATENT DOCUMENTS

| JP | 11-094371 A | 4/1999 |
| JP | 2010-008003 A | 1/2010 |

(Continued)

OTHER PUBLICATIONS

International Search Report of the International Searching Authority dated Oct. 27, 2020 issued in corresponding International Patent Application No. PCT/JP2020/031592 (with English translation).
(Continued)

*Primary Examiner* — Jonathan Bradford
(74) *Attorney, Agent, or Firm* — Posz Law Group, PLC

(57) ABSTRACT

A refrigerating and air-conditioning apparatus performs a defrosting operation. The refrigerating and air-conditioning apparatus includes a refrigerant circuit, a temperature sensor, and a heat generation control unit. In the refrigerant circuit, a compressor, a first heat exchanger, an expansion device, a second heat exchanger, and a four-way valve are connected to each other by pipes to allow refrigerant to circulate through the refrigerant circuit. The temperature sensor measures a temperature of the compressor. The heat generation control unit increases a temperature of the compressor when the heat generation control unit detects a decrease in a value measured by the temperature sensor in a defrosting operation performed on the first heat exchanger.

9 Claims, 10 Drawing Sheets

(51) Int. Cl.
*F25B 47/02* (2006.01)
*F25B 13/00* (2006.01)

(52) U.S. Cl.
CPC ..... *F25B 2347/02* (2013.01); *F25B 2600/021* (2013.01); *F25B 2700/21152* (2013.01)

(56) References Cited

FOREIGN PATENT DOCUMENTS

| | | | |
|---|---|---|---|
| JP | 2010-032102 | A | 2/2010 |
| JP | 6476515 | B2 | 3/2019 |
| WO | 2019/207661 | A1 | 10/2019 |
| WO | 2020/008620 | A1 | 1/2020 |

OTHER PUBLICATIONS

Office Action dated Aug. 29, 2023 issued in corresponding Japanese Patent Application No. 2022-543239 (and English translation).
Extended European Search Report dated Sep. 14, 2023 issued in corresponding European Patent Application No. 20950329.1.

REFRIGERATING AND AIR-CONDITIONING APPARATUS

CROSS REFERENCE TO RELATED APPLICATION

This application is a U.S. national stage application of PCT/JP2020/031592 filed on Aug. 21, 2020, the contents of which are incorporated herein by reference.

TECHNICAL FIELD

The present disclosure relates to a refrigerating and air-conditioning apparatus that performs defrosting operation.

BACKGROUND ART

In a refrigerating and air-conditioning apparatus, when frost is formed on a heat-source-side heat exchanger, the frost causes the air-conditioning capacity to be reduced. To restore this reduced air-conditioning capacity, the refrigerating and air-conditioning apparatus performs defrosting operation by heating the heat-source-side heat exchanger during heating operation to melt the frost. In the defrosting operation, since the heat-source-side heat exchanger is heated, heat energy is consumed in the heat-source-side heat exchanger.

It is known that during defrosting operation, a phenomenon called "liquid-back phenomenon" occurs in which liquid refrigerant is suctioned back into the compressor. Patent Literature 1 discloses a method to prevent the occurrence of liquid-back phenomenon during defrosting operation by heating the refrigerant using an inverter. Another method is known as minimizing heat shock in an intelligent power module during defrosting operation by heating the inverter of the intelligent power module.

CITATION LIST

Patent Literature

Patent Literature 1: WO 2020008620

SUMMARY OF INVENTION

Technical Problem

In defrosting operation, a heat-source-side heat exchanger is heated, and thus heat energy is consumed. Consequently, the temperature of a use-side heat exchanger decreases. A refrigerating and air-conditioning apparatus originally functions as a heat pump that, during heating operation, allows a heat-source-side heat exchanger to serve as an evaporator to decrease the temperature, while allowing a use-side heat exchanger to serve as a condenser to increase the temperature. Therefore, the defrosting operation that results in a decrease in the temperature of the use-side heat exchanger temporarily degrades the function as a heat pump, which is undesirable for the users. In view of the above, it is desirable that the defrosting operation is performed for the shortest time possible to cause only a slight temperature change.

Although many techniques related to defrosting have been considered until now, only a few of the techniques involve an increase in the heating amount. For example, the method disclosed in Patent Literature 1 is to heat the inverter for the purpose of preventing a special environmental condition called "liquid-back phenomenon" during defrosting operation. However, this method is not intended to improve the performance of the refrigerating and air-conditioning apparatus under general defrosting conditions. Further, the method to heat the intelligent power module is a technique effective only for a case where refrigerant is used as a method of cooling the inverter. In addition, this technique controls the heat generation amount of the inverter, which does not always lead to improvement in the defrosting operation itself.

The present disclosure has been made to solve the above problems, and an object of the present disclosure is to provide a refrigerating and air-conditioning apparatus that can reduce the time period during which the heating capacity is reduced due to defrosting.

Solution to Problem

A refrigerating and air-conditioning apparatus according to an embodiment of the present disclosure includes: a refrigerant circuit in which a compressor, a first heat exchanger, an expansion device, a second heat exchanger, and a four-way valve are connected to each other by pipes to allow refrigerant to circulate through the refrigerant circuit; a temperature sensor configured to measure a temperature of the compressor; and a heat generation control unit configured to increase a temperature of the compressor when the heat generation control unit detects a decrease in a value measured by the temperature sensor in defrosting operation performed on the first heat exchanger.

Advantageous Effects of Invention

In the refrigerating and air-conditioning apparatus according to an embodiment of the present disclosure, when the temperature of the compressor becomes equal to or lower than a predetermined value, a temperature control is executed to increase the temperature of the compressor, so that the temperature of refrigerant discharged from the compressor decreases moderately. Therefore, the refrigerating and air-conditioning apparatus can finish the defrosting operation performed on the first heat exchanger earlier, and reduce the time period during which the second heat exchanger has a reduced heating capacity after the defrosting operation.

DESCRIPTION OF EMBODIMENTS

Embodiment 1

Figure 1:
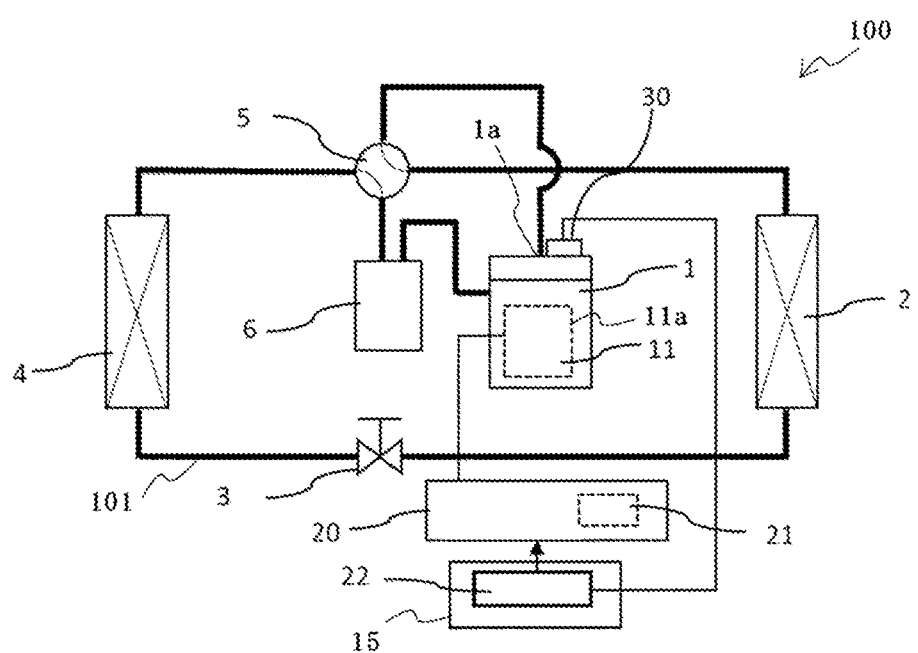
FIG. 1 is a circuit configuration diagram of a refrigerating and air-conditioning apparatus according to Embodiment 1.

A refrigerating and air-conditioning apparatus 100 according to Embodiment 1 is described below. Note that the relationship of sizes of the constituent components in the drawings described below may differ from that of actual ones. In addition, in the drawings below, the same reference signs denote the same or equivalent components, which are common throughout the entire specification. Furthermore, the forms of the constituent elements represented throughout the entire specification are merely examples, and do not intend to limit the constituent elements to the forms described in the specification.

Configuration of Refrigerating and Air-Conditioning Apparatus

FIG. 1 is a circuit configuration diagram of the refrigerating and air-conditioning apparatus 100 according to Embodiment 1. As illustrated in FIG. 1, the refrigerating and air-conditioning apparatus 100 includes a refrigerant circuit in which a compressor 1, a first heat exchanger 2, an expansion device 3, a second heat exchanger 4, a four-way valve 5, and an accumulator 6 are connected to each other by pipes 101 to allow refrigerant to circulate through the refrigerant circuit. The refrigerating and air-conditioning apparatus 100 includes a temperature sensor 30 and a controller 15.

The compressor 1 suctions and compresses refrigerant into a high-temperature high-pressure state, and then discharges the compressed refrigerant. The compressor 1 is made up of an inverter compressor capable of controlling the capacity, or other type of compressor. The compressor 1 has a built-in motor 11. The motor 11 drives a compression mechanism portion (not illustrated) of the compressor 1 to generate power for the compressor 1. The motor 11 is electrically connected to an inverter 20. Driving of the motor 11 is controlled by the inverter 20. The motor 11 includes windings and an iron core (not illustrated) that constitute a contact surface a in contact with refrigerant. The motor 11 has a mechanism to receive heat energy between the windings and the refrigerant and between the iron core and the refrigerant. The inverter 20 is provided with a heat generation control unit 21.

The first heat exchanger 2 and the second heat exchanger 4 are configured to exchange heat between refrigerant and a heat medium such as air. The first heat exchanger 2 and the second heat exchanger 4 are, for example, fin-and-tube heat exchangers. For example, the first heat exchanger 2 is located outdoors, and the second heat exchanger 4 is located indoors. When the refrigerating and air-conditioning apparatus 100 performs cooling operation, the first heat exchanger 2 serves as a condenser. When the refrigerating and air-conditioning apparatus 100 performs heating operation, the first heat exchanger 2 serves as an evaporator. An example is described below, in which the first heat exchanger 2 is located outdoors, while the second heat exchanger 4 is located indoors.

The expansion device 3 is configured to expand refrigerant and reduce the pressure of the refrigerant. The expansion device 3 can optionally control its opening degree and is, for example, an electronic expansion valve. The opening degree of the expansion device 3 is controlled by, for example, the controller 15. The expansion device 3 is connected between the first heat exchanger 2 and the second heat exchanger 4. The expansion device 3 brings refrigerant having flowed out of either the first heat exchanger 2 or the second heat exchanger 4, whichever serves as a condenser, into a low-temperature low-pressure state, and then allows the refrigerant in the low-temperature low-pressure state to flow into the other heat exchanger that serves as an evaporator. When the refrigerating and air-conditioning apparatus 100 performs cooling operation, the refrigerant having flowed out of the first heat exchanger 2 flows into the expansion device 3, is brought into a low-temperature low-pressure state, and then flows into the second heat exchanger 4.

The four-way valve 5 has a function of switching between the flow direction of refrigerant for heating and the flow direction of refrigerant for cooling. The operation of the four-way valve 5 is controlled by, for example, the controller 15. The four-way valve 5 switches to such a flow passage of refrigerant that the discharge side of the compressor 1 is connected to either the first heat exchanger 2 or the second heat exchanger 4, whichever serves as a condenser. The accumulator 6 stores surplus refrigerant therein.

The temperature sensor 30 detects the temperature of refrigerant discharged from the compressor 1. The temperature sensor 30 is attached to a discharge port 1a of the compressor 1. The temperature sensor 30 is provided, for example, on the pipe 101 connecting the compressor 1 and the four-way valve 5. Information on the temperature measured by the temperature sensor 30 is input to a mode determination unit 22 in the controller 15.

The controller 15 includes the mode determination unit 22 configured to determine the operating mode in the inverter 20 based on the information on the temperature measured by the temperature sensor 30. The operating mode includes a high-efficiency operation mode that is a normal mode, and a heating-priority operation mode that is executed during defrosting operation.

The high-efficiency operation mode is a normal operation mode in which energy efficiency is optimized to operate the refrigerating and air-conditioning apparatus 100. A commonly-known method can be employed for the high-efficiency operation mode. The heating-priority operation mode is intended to intentionally reduce the power factor of the motor 11 to increase the current in the compressor 1 and thus increase the heat generation amount in the motor 11. In defrosting operation in the high-efficiency operation mode, when the value measured by the temperature sensor 30 decreases, the operation mode is switched to the heating-priority operation mode, in which the temperature control is executed to increase the temperature of the compressor 1. In the heating-priority operation mode, the refrigerating and air-conditioning apparatus 100 is operated with a current within a range below a rated current I[A], from which a desired heating amount is obtained. Note that as the motor 11, it is desirable to use a motor 11 in which the relationship between a winding resistance R[Ω], a rated input P[W], and the rated current I[A] satisfies $0.001 < (3*I*I*R)/P$. The reasons for this are that $(3*I*I*R)$ within the parentheses of the above expression represents a rated heat generation amount [W] generated in the windings of the motor 11, and in such a high-efficiency motor that the ratio of heat generation to the output of the motor 11 is less than 0.001, it is hardly effective to use the heat generated in the windings for heating liquid refrigerant.

The mode determination unit 22 generates a mode signal depending on the operating mode. The mode signal generated by the mode determination unit 22 is input to the inverter 20 and used for the process in the heat generation control unit 21. The heat generation control unit 21 is activated or deactivated by the mode signal input from the mode determination unit 22. The heat generation control unit 21 will be described later in detail.

The controller 15 includes a microcomputer. The microcomputer includes, for example, a control arithmetic processing device such as a central processing unit (CPU). The microcomputer further includes an I/O port configured to manage inputs and outputs. The microcomputer still further includes a storage unit (not illustrated). Examples of the storage unit include a volatile storage device such as a random access memory (RAM) configured to temporarily store data therein, and a nonvolatile auxiliary storage device such as a hard disk or a flash memory configured to store data therein on a long-term basis. The storage unit has data of the program for the control arithmetic processing device to execute the process procedure. The control arithmetic processing device executes the processes based on the data of the program, thereby implementing the process in each unit.

The refrigerating and air-conditioning apparatus 100 performs cooling operation, heating operation, and defrosting operation under control of the controller 15. The controller 15 controls the operation of the four-way valve 5 to switch between the flow directions of refrigerant, thereby to execute any of the cooling operation, the heating operation, or the defrosting operation.

Cooling Operation

In cooling operation of the refrigerating and air-conditioning apparatus 100, the first heat exchanger 2 serves as a condenser, while the second heat exchanger 4 serves as an evaporator. As illustrated in FIG. 1, in the cooling operation, refrigerant compressed by the compressor 1 into a high-temperature high-pressure gas state is discharged from the compressor 1, passes through the four-way valve 5, and flows into the first heat exchanger 2 that acts as a condenser. The refrigerant in the gas state exchanges heat with outside air in the first heat exchanger 2, and then condenses into liquid. The refrigerant having condensed into a liquid state flows into the expansion device 3, and is expanded and reduced in pressure in the expansion device 3, so that the refrigerant is brought into a low-temperature low-pressure two-phase gas-liquid state. The refrigerant in the two-phase gas-liquid state flows into the second heat exchanger 4 that acts as an evaporator, then exchanges heat with room air in the second heat exchanger 4, and evaporates into gas. At this time, the room air is cooled and thus cooling is performed in the room. The refrigerant having evaporated into a low-temperature low-pressure gas state passes through the four-way valve 5 and is suctioned into the compressor 1.

Heating Operation

Figure 2:
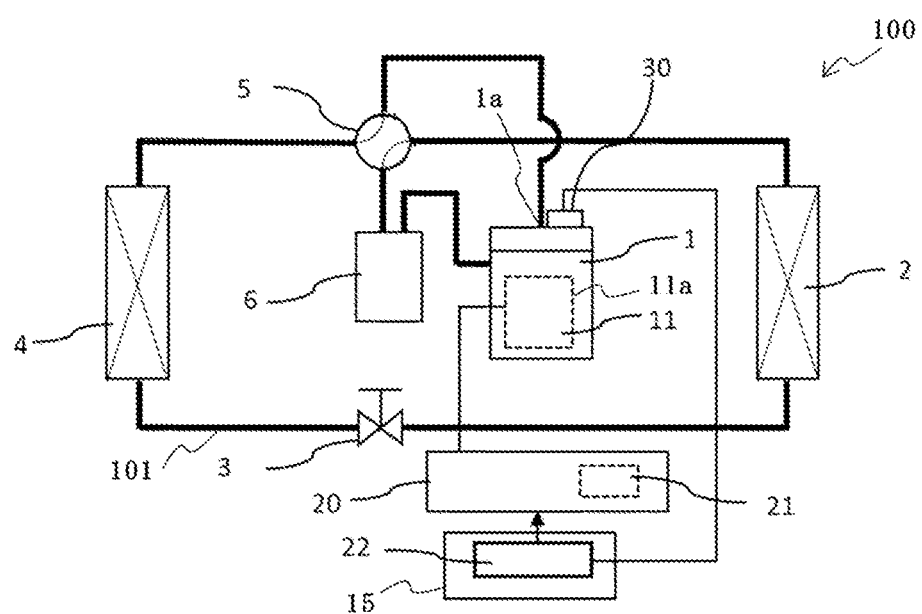
FIG. 2 is a refrigerant circuit diagram of the refrigerating and air-conditioning apparatus according to Embodiment 1 during heating operation.

FIG. 2 is a refrigerant circuit diagram of the refrigerating and air-conditioning apparatus 100 according to Embodiment 1 during heating operation. In heating operation, the first heat exchanger 2 serves as an evaporator, while the second heat exchanger 4 serves a condenser. As illustrated in FIG. 2, in the heating operation, refrigerant compressed by the compressor 1 into a high-temperature high-pressure gas state is discharged from the compressor 1, passes through the four-way valve 5, and flows into the second heat exchanger 4 that acts as a condenser. In the second heat exchanger 4, the refrigerant in the gas state exchanges heat with room air, and then condenses into liquid. At this time, the room air is heated and thus heating is performed in the room. The refrigerant having condensed into a liquid state flows into the expansion device 3, and is expanded and reduced in pressure in the expansion device 3, so that the refrigerant is brought into a low-temperature low-pressure two-phase gas-liquid state. The refrigerant in the two-phase gas-liquid state flows into the first heat exchanger 2 that acts as an evaporator, then exchanges heat with outside air in the first heat exchanger 2, and evaporates into gas. The refrigerant having evaporated into a low-temperature low-pressure gas state passes through the four-way valve 5 and is suctioned into the compressor 1.

In the heating operation, the first heat exchanger 2 transfers heat to the outside low-temperature air, and is thereby maintained at a temperature lower than that of the outside air. When heating is continuously performed, moisture contained in the outside air adheres to the first heat exchanger 2, which may cause frost to be formed. The refrigerating and air-conditioning apparatus 100 performs defrosting operation to prevent the phenomenon in which the frost formed in the first heat exchanger 2 grows, resulting in an increase in the airflow resistance in the first heat exchanger 2, and thus a decrease in the heat exchange efficiency. For example, the defrosting operation is performed regularly. The refrigerating and air-conditioning apparatus 100 may be configured to perform the defrosting operation when the condition for starting the defrosting operation is satisfied. For example, the condition for starting the defrosting operation may be that the outside air temperature has reached a predetermined temperature. The defrosting operation is not limited to being performed at a particular timing.

Defrosting Operation

In defrosting operation, the four-way valve 5 is switched to the flow direction of refrigerant for the cooling operation, such that the refrigerating and air-conditioning apparatus 100 has the refrigerant circuit configuration illustrated in FIG. 1. In the defrosting operation, high-temperature high-pressure gas refrigerant discharged from the compressor 1 flows into the first heat exchanger 2 via the four-way valve 5. At this time, the frost adhering to the first heat exchanger 2 receives heat from the high-temperature high-pressure gas refrigerant and then melts. The refrigerant in the liquid state flows out of the first heat exchanger 2, passes through the expansion device 3, the second heat exchanger 4, and the four-way valve 5, and is suctioned into the compressor 1. For example, the defrosting operation is continued for a given period of time. The defrosting operation ends when the condition for ending the defrosting operation is satisfied, and then the heating operation is restarted. For example, the condition for ending the defrosting operation may be a given period of time. The condition for ending the defrosting operation is not particularly limited.

Inverter Configuration

Figure 3:
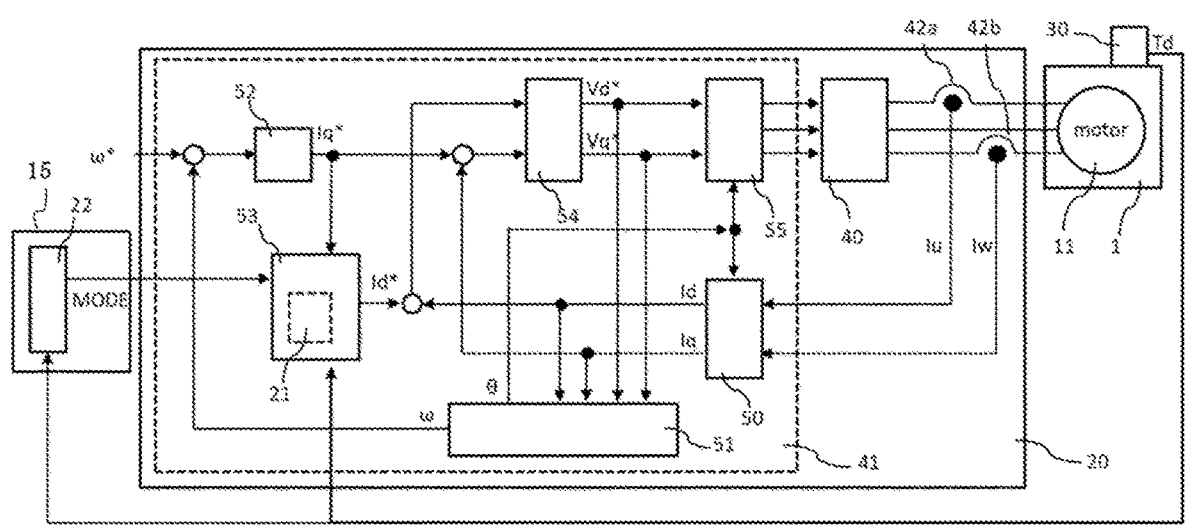
FIG. 3 is a circuit configuration diagram illustrating the configuration of an inverter according to Embodiment 1.

FIG. 3 is a circuit configuration diagram illustrating the configuration of the inverter 20 according to Embodiment 1. The inverter 20 has an improved response to the current control based on the value measured by the temperature sensor 30 and input to a control circuit 41. As illustrated in FIG. 3, the inverter 20 is electrically connected to the controller 15 and the compressor 1, and includes a power conversion unit 40 and the control circuit 41. The heat generation control unit 21 is provided in the control circuit 41 of the inverter 20.

The power conversion unit 40 supplies power to the motor 11 based on a voltage command generated in the control circuit 41. The power conversion unit 40 is a circuit equipped with semiconductor elements, including a switching element such as an IGBT configured to convert power. The switching element of the power conversion unit 40 performs switching operation based on the voltage command.

A current sensor 42a and a current sensor 42b are provided to detect a U-phase current Iu and a V-phase current Iv supplied from the power conversion unit 40 to the motor 11. The values of U-phase current Iu and V-phase current Iv detected respectively by the current sensor 42a and the current sensor 42b are input to the control circuit 41.

The control circuit 41 generates a voltage command to be input to the power conversion unit 40. The control circuit 41 includes a dq conversion unit 50, an inverse dq conversion unit 55, a position and velocity estimation unit 51, a velocity control unit 52, an excitation-current command generation unit 53, and a current control unit 54. The heat generation control unit 21 is provided in the excitation-current command generation unit 53.

The control circuit 41 includes a microcomputer including a control arithmetic processing device such as a central processing unit (CPU). The control circuit 41 further includes an I/O port configured to manage inputs and outputs. The microcomputer further includes a storage unit (not illustrated). Examples of the storage unit include a volatile storage device such as a random access memory (RAM) configured to temporarily store data therein, and a nonvolatile auxiliary storage device such as a hard disk or a flash memory configured to store data therein on a long-term basis. The storage unit has data of the program for the control arithmetic processing device to execute the process procedure. The control arithmetic processing device executes the processes based on the data of the program, thereby implementing the process in each unit.

The dq conversion unit 50 converts information on the U-phase current Iu and the V-phase current Iv input respectively from the current sensors 42a and 42b to $d$-$q$ axis current information that is an excitation current Id and a torque current Iq. The inverse dq conversion unit 55 converts the d-q axis voltage commands that are a d-axis voltage command Vd* and a q-axis voltage command Vq* to AC voltage commands. The position and velocity estimation unit 51 estimates a rotational position θ and a rotational velocity ω of the motor 11 from the d-axis voltage command Vd*, the q-axis voltage command Vq*, the excitation current Id, and the torque current Iq. The velocity control unit 52, the excitation-current command generation unit 53, and the current control unit 54 individually control the rotational velocity ω of the motor 11.

The inverter 20 controls driving of the motor 11 in such a manner that the rotational velocity ω of the motor 11 of the compressor 1 corresponds with a velocity command ω* input from the controller 15. A commonly-used hermetically-sealed compressor 1 does not have a built-in rotation sensor for the reason that the motor 11 is exposed to high-temperature high-pressure refrigerant. Thus, information on the currents flowing in the compressor 1 is used to estimate the rotational position and rotational velocity of the motor 11 to operate the motor 11. The inverter 20 controls driving of the motor 11 by executing a sensorless vector control intended to estimate information on the rotational position θ and rotational velocity ω of the motor 11 by using the information on the currents flowing in the motor 11.

The sensorless vector control uses the rotational position θ output from the position and velocity estimation unit 51 to perform dq conversion and inverse dq conversion. The sensorless vector control also uses the rotational velocity ω output from the position and velocity estimation unit 51 to control the velocity. The rotational velocity ω is compared with the velocity command ω* in the velocity control unit 52. Based on the result of comparison, a torque current command Iq* is generated.

The torque current command Iq* is maintained at such a value that the rotational velocity ω consistently corresponds with the velocity command ω* by the velocity control unit 52 including an integrator therein. The torque current command Iq* is input to the current control unit 54 along with an excitation current command Id* generated in the excitation-current command generation unit 53. The excitation-current command generation unit 53 will be described later in detail.

In the current control unit 54, the d-axis voltage command Vd* is generated such that the excitation current Id corresponds with the excitation current command Id*, and also the q-axis voltage command Vq* is generated such that the torque current Iq corresponds with the torque current command Iq*.

The d-axis voltage command Vd* and the q-axis voltage command Vq* generated in the current control unit 54 are converted to AC voltage commands in the inverse dq conversion unit 55. Based on the AC voltage commands converted in the inverse dq conversion unit 55, the power conversion unit 40 generates a voltage to operate the motor 11 at a predetermined rotation speed.

Configuration of Excitation-Current Command Generation Unit 53

Figure 4:
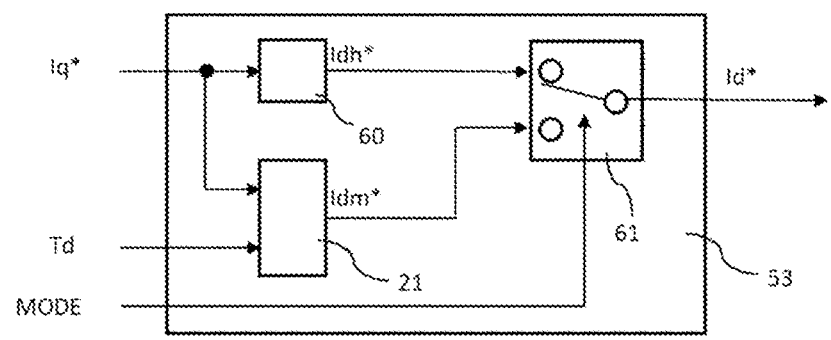
FIG. 4 is a circuit configuration diagram illustrating the configuration of an excitation-current command generation unit according to Embodiment 1.

FIG. 4 is a circuit configuration diagram illustrating the configuration of the excitation-current command generation unit 53 according to Embodiment 1. As illustrated in FIG. 4, the excitation-current command generation unit 53 includes a high-efficiency control unit 60, the heat generation control unit 21, and a selector 61. The high-efficiency control unit 60 calculates a highly-efficient excitation current command Idh*. The heat generation control unit 21 calculates a heating excitation current command Idm*.

Based on a mode signal MODE generated in the mode determination unit 22 in the controller 15, the selector 61 selects which of the current commands is output, the highly-efficient excitation current command Idh* or the heating excitation current command Idm*. Then, the selector 61 outputs the selected current command as the excitation current command Id*.

The excitation current command Id* is an operation amount to control the power factor of the motor 11. In general, the power factor is set such that the current becomes maximized or minimized. The excitation-current command generation unit 53 in Embodiment 1 controls the power factor in such a manner that the power factor varies depending on the mode signal MODE, the torque current command Iq*, and a discharge temperature Td in the compressor 1. When a high-efficiency operation mode is defined in the mode signal MODE, the excitation current command Id* is output such that the U-phase current Iu and the V-phase current Iv become minimized. When a heating-priority operation mode is defined in the mode signal MODE, the excitation current command Id* is output such that the U-phase current Iu and the V-phase current Iv become a maximum current value Imax set in advance.

Based on the torque current command Iq*, the high-efficiency control unit 60 outputs the highly-efficient excitation current command Idh* that minimizes the U-phase current Iu and the V-phase current Iv.

Based on the torque current command Iq* and the discharge temperature Td in the compressor 1, the heat generation control unit 21 calculates the heating excitation current command Idm* such that the U-phase current Iu and the V-phase current Iv become the maximum current value Imax set in advance.

When receiving an input of the mode signal MODE in which the high-efficiency operation mode is defined, the selector 61 outputs the highly-efficient excitation current command Idh*, having been output from the high-efficiency control unit 60, as the excitation current command Id*.

When receiving an input of the mode signal MODE in which the heating-priority operation mode is defined, the selector 61 outputs the heating excitation current command Idm*, having been output from the heat generation control unit 21, as the excitation current command Id*. That is, the heat generation control unit 21 in the inverter 20 controls heat generation, using the excitation current command Idm* for the motor 11 as a controlled variable.

Configuration of Heat Generation Control Unit

Figure 5:
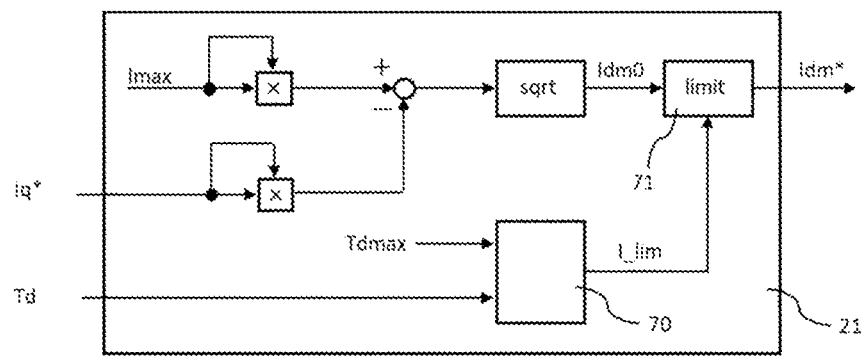
FIG. 5 is a circuit configuration diagram illustrating the configuration of a heat generation control unit according to Embodiment 1.

FIG. 5 is a circuit configuration diagram illustrating the configuration of the heat generation control unit 21 according to Embodiment 1. As illustrated in FIG. 5, the heat generation control unit 21 includes an upper-limit current calculation unit 70 and a limiter 71.

The upper-limit current calculation unit 70 calculates an upper-limit current value I_lim based on the discharge temperature Td in the compressor 1, and based on an upper-limit discharge temperature value Tdmax in the compressor 1. The limiter 71 limits the heating excitation current command Idm* based on the upper-limit current value Ilim.

Next, the process in the excitation-current command generation unit 53 is described with reference to FIGS. 4 and 5. The excitation-current command generation unit 53 generates the excitation current command Id* based on the MODE signal in which the high-efficiency operation mode or the heating-priority operation mode is defined, the torque current command Iq*, and the discharge temperature Td in the compressor 1.

In the excitation-current command generation unit 53, the torque current command Iq* is input to the high-efficiency control unit 60 and to the heat generation control unit 21. The high-efficiency control unit 60 calculates the highly-efficient excitation current command Idh+. The heat generation control unit 21 calculates the heating excitation current command Idm*. Then, based on the mode signal MODE, the selector 61 selects which of the current commands is output as the excitation current command Id*, the highly-efficient excitation current command Idh* or the heating excitation current command Idm*.

In the high-efficiency control unit 60, for example, the excitation current command Id* is generated such that the U-phase current Iu and the V-phase current Iv become minimized. The high-efficiency control unit 60 may have a commonly-known configuration.

In the heat generation control unit 21, a temporary heating excitation current command Idm0* is calculated by using Expression 1 below based on the torque current command Iq* and the maximum current value Imax set in advance. As described above, the maximum current value Imax is calculated in the upper-limit current calculation unit 70 based on the discharge temperature Td in the compressor 1, and based on the upper-limit discharge temperature value Tdmax of the compressor 1.

$$Idm0^* 32\sqrt{Imax^2 - Iq^{*2}} \qquad \text{[Expression 1]}$$

The limiter 71 limits the absolute value of the temporary heating excitation current command Idm0* by using the upper-limit current value Ilim, and obtains the heating excitation current command Idm* accordingly. The heating excitation current command Idm* obtained is output from the excitation-current command generation unit 53 as the excitation current command Id* whose upper limit is controlled by the upper-limit discharge temperature value Tdmax and the maximum current value Imax. The output excitation current command Id* is input to the inverse dq conversion unit 55 via the current control unit 54. By receiving a voltage command converted by the inverse dq conversion unit 55, the power conversion unit 40 generates a voltage to operate the motor 11 at a predetermined rotation speed.

Control in Defrosting Operation (Comparative Example)

Figure 6:
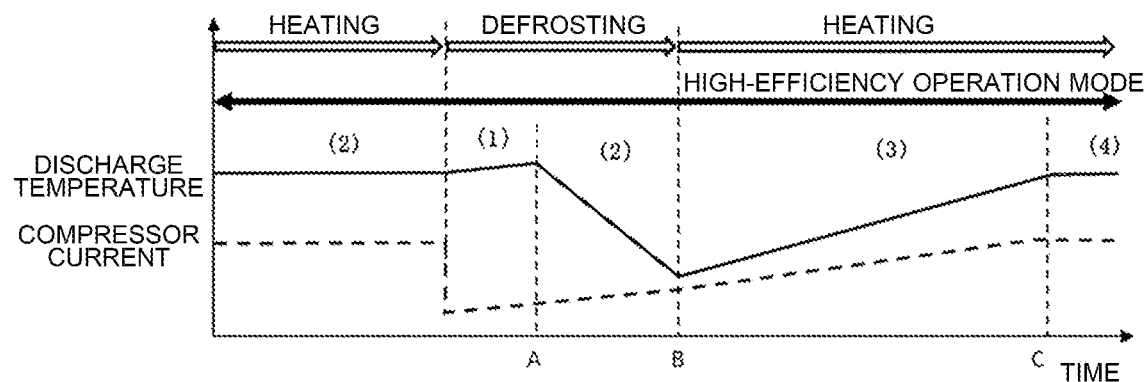
FIG. 6 is a graph showing the relationship between the discharge temperature in a compressor, the current in the compressor, and the time in a refrigerating and air-conditioning apparatus according to Comparative Example.

FIG. 6 is a graph showing the relationship between the discharge temperature in the compressor 1, the current in the compressor 1, and the time in a refrigerating and air-conditioning apparatus according to Comparative Example. FIG. 6 shows the operation state of the refrigerating and air-conditioning apparatus according to Comparative Example during the heating operation, the defrosting operation, and back to the heating operation. In FIG. 6, the vertical axis represents the discharge temperature and the current in the compressor 1, while the horizontal axis represents time. In FIG. 6, the solid line illustrates the discharge temperature in the compressor 1, and the dotted line illustrates the compressor current. As illustrated in FIG. 6, in Comparative Example, during both the heating operation and the defrosting operation, the refrigerating and air-conditioning apparatus operates in the high-efficiency operation mode that is a normal mode.

In section (1) of FIG. 6, the refrigerating and air-conditioning apparatus has just switched from the heating operation to the defrosting operation. In this section, since refrigerant in the second heat exchanger 4, having increased in temperature to a high level during the heating operation, flows backward to the compressor 1, the discharge temperature in the compressor 1 slightly increases.

Thereafter, in section (2) having passed over the point A of FIG. 6, the compressor 1 itself has heat that is consumed to remove frost in the first heat exchanger 2, so that the low-temperature refrigerant is suctioned into the compressor 1. This causes the heat of the compressor 1 itself to be transferred to the refrigerant, and the discharge temperature decreases accordingly. During the defrosting operation, as the temperature of the refrigerant decreases, the pressure of the refrigerant decreases accordingly, so that the current in the compressor 1 is also lower than that during the heating. The defrosting operation is continued until the frost melts or for a given period of time.

At the point B of FIG. 6, the defrosting operation ends, and the four-way valve 5 is switched again to the state during the heating operation illustrated in FIG. 2 to restart the heating operation. In section (3) of FIG. 6 immediately after the operation switches from the defrosting operation to the heating operation, since heat energy of the compressor 1 has been used for defrosting, the discharge temperature in the compressor 1 is lower than that detected before the defrosting operation.

Thereafter, the discharge temperature in the compressor 1 gradually increases back, at the point C of FIG. 6, to the level detected before the defrosting operation. Eventually, in section (4) of FIG. 6, the refrigerating and air-conditioning apparatus can have adequate capacity for heating operation.

In view of the above, a predetermined preheating time illustrated in section (3) of FIG. 6 is required for the refrigerating and air-conditioning apparatus according to Comparative Example to reach adequate capacity for heating operation after the defrosting operation. In sections (2) and (3) of FIG. 7 during the defrosting operation and preheating operation, heating is not performed at all or is insufficiently performed, so that the refrigerating and air-conditioning apparatus cannot exhibit the heating performance desired by the users.

Control in Defrosting Operation (Embodiment)

Figure 7:
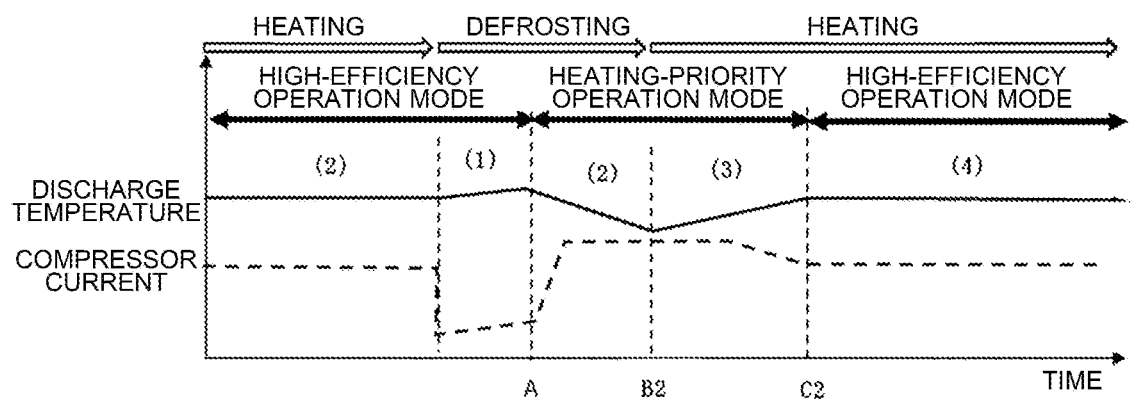
FIG. 7 is a graph showing the relationship between the discharge temperature in a compressor, the current in the compressor, and the time in the refrigerating and air-conditioning apparatus according to Embodiment 1.

Next, control in the defrosting operation in the refrigerating and air-conditioning apparatus 100 according to Embodiment 1 is described. FIG. 7 is a graph showing the relationship between the discharge temperature in the compressor 1, the current in the compressor 1, and the time in the refrigerating and air-conditioning apparatus 100 according to Embodiment 1. Similarly to FIG. 6, FIG. 7 shows the operation state of the refrigerating and air-conditioning apparatus according to Embodiment 1 during the heating operation, the defrosting operation, and back to the heating operation. In FIG. 7, the vertical axis represents the discharge temperature and the current in the compressor 1, while the horizontal axis represents time. In FIG. 7, the solid line illustrates the discharge temperature in the compressor 1, and the dotted line illustrates the compressor current.

As illustrated in FIG. 7, the refrigerating and air-conditioning apparatus 100 operates in the high-efficiency operation mode that is a normal mode during the heating operation. After the start of defrosting operation, when detecting a decrease in the value measured by the temperature sensor 30 during the defrosting operation performed on the first heat exchanger 2, the refrigerating and air-conditioning apparatus 100 switches to the heating-priority operation mode, and causes the heat generation control unit 21 to increase the temperature of the compressor 1. The heat generation control unit 21 increases the loss in the motor 11 thereby to increase the temperature of the compressor 1. The process performed by the heat generation control unit 21 causes the power factor of the motor 11 to be intentionally decreased to increase the current in the compressor 1, so that the heat generation amount of the motor 11 increases, and the temperature of the compressor 1 increases accordingly.

In section (1) of FIG. 7 immediately after the operation has switched from the heating operation to the defrosting operation as described above, refrigerant in the second heat exchanger 4, having increased in temperature to a high level during the heating operation, flows backward to the compressor 1, and thus the discharge temperature in the compressor 1 slightly increases. In this section, since the value measured by the temperature sensor 30 does not decrease, the operation is continued in the normal high-efficiency operation mode.

When the discharge temperature in the compressor 1 detected by the temperature sensor 30 starts decreasing at the point A of FIG. 7 during the defrosting operation, the mode determination unit 22 in the controller 15 issues a command to the inverter 20 to switch the operation from the normal high-efficiency operation mode to the heating-priority operation mode.

In section (2) after the point A of FIG. 7, in the heating-priority operation mode, the heat generation control unit 21 in the inverter 20 receives the command from the mode determination unit 22, and then controls the current to be increased and supplied to the motor 11 of the compressor 1, thereby increasing the loss of the motor 11. That is, the heat generation control unit 21 uses the value of current to be supplied to the motor 11 as a controlled variable. As the current in the motor 11 increases, copper loss is generated as heat in the windings of the motor 11 in proportion to the square of current. The heat generated in the motor 11 is transferred to refrigerant on the contact surface 11a on which the motor 11 is in contact with the refrigerant. Consequently, the temperature of the refrigerant increases. As the heat generation amount in the motor 11 increases, the temperature of the refrigerant suctioned into the compressor 1 decreases moderately. The defrosting operation is performed in a state in which the discharge temperature decreases minimally, and then ends at the point B2 of FIG. 7. This results in a reduction in the defrosting operation time in sections (1) and (2) of FIG. 7 compared to Comparative Example.

In section (3) after the point B2 of FIG. 7, the operation has switched from the defrosting operation to the heating operation to restart the heating operation. At this time, the mode determination unit 22 in the controller 15 issues to the inverter 20 an operation mode in which the heating-priority operation mode is still continued. That is, at the start of heating operation, the process of increasing the temperature of the compressor 1 is still continued by the heat generation control unit 21.

At the point C2 after section (3) of FIG. 7, when confirming that the discharge temperature in the compressor 1 has recovered to the level detected before the defrosting operation, the controller 15 issues a mode switching instruction to switch from the heating-priority operation mode to the high-efficiency operation mode. This results in a reduction in the preheating time in section (3) of FIG. 7 after the defrosting operation compared to Comparative Example. Thereafter, the operation in the inverter 20 is switched to the high-efficiency operation mode.

Figure 8:
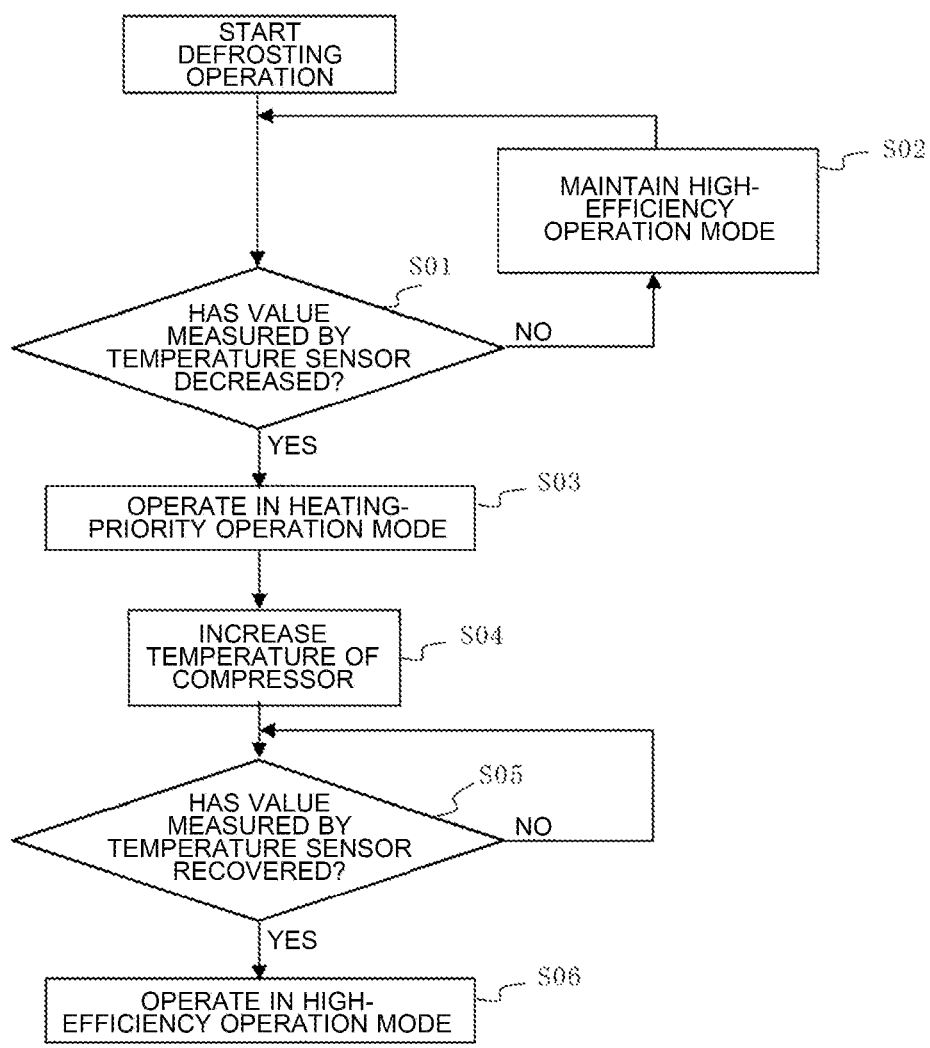
FIG. 8 is a flowchart of the processes in defrosting operation of the refrigerating and air-conditioning apparatus according to Embodiment 1.

FIG. 8 is a flowchart of the processes in defrosting operation of the refrigerating and air-conditioning apparatus 100 according to Embodiment 1. The defrosting operation is performed by the processing in the controller 15. As illustrated in FIG. 8, the controller 15 starts the defrosting operation when determining that the condition for starting the defrosting operation has been satisfied. In step S01, the mode determination unit 22 in the controller 15 determines whether the value measured by the temperature sensor 30 has decreased.

When the mode determination unit 22 in the controller 15 determines in step S01 that the value measured by the temperature sensor 30 has not decreased, the mode determination unit 22 shifts the process to step S02 to maintain the operation mode at the high-efficiency operation mode, and repeats this process until the measured value is determined to have decreased. This section corresponds to section (1) of FIG. 7.

When the mode determination unit 22 in the controller 15 determines in step S01 that the value measured by the temperature sensor 30 has decreased, the mode determination unit 22 shifts the process to step S03 to change the operation mode from the high-efficiency operation mode to the heating-priority operation mode, and then shifts the process to step S04. In step S04, the mode determination unit 22 in the controller 15 generates a mode signal in which the heating-priority operation mode is defined, and inputs the mode signal to the heat generation control unit 21. With this process, the temperature control is executed to increase the temperature of the compressor 1. This point in time corresponds to the point A of FIG. 7.

In step S05, the mode determination unit 22 in the controller 15 determines whether the value measured by the temperature sensor 30 has recovered to the same value as measured by the temperature sensor 30 and detected before the defrosting operation. When determining in step S05 that the value measured by the temperature sensor 30 has not yet recovered to the same value as detected before, the mode determination unit 22 in the controller 15 repeats this process until the measured value is determined to have recovered to the same value as detected before. This section corresponds to sections (2) and (3) of FIG. 7.

When determining in step S05 that the value measured by the temperature sensor 30 has recovered to the same value as detected before, the mode determination unit 22 in the controller 15 shifts the process to step S06 to change the operation mode from the heating-priority operation mode to the high-efficiency operation mode, and then generates a mode signal in which the high-efficiency operation mode is defined to input the mode signal to the heat generation control unit 21. This stops the temperature control intended to increase the temperature of the compressor 1 in the heating-priority operation mode. Instead, the high-efficiency operation mode is continued. This point in time corresponds to section (4) from the point C2 onward in FIG. 7.

In the manner as described above, in the refrigerating and air-conditioning apparatus 100, the discharge temperature in the compressor 1 decreases minimally during the defrosting operation and at the start of heating operation, and the time period from the defrosting operation to the heating operation until the start of normal operation is reduced. Therefore, the refrigerating and air-conditioning apparatus 100 achieves the operation that is comfortable for the users.

Maintaining the temperature of the compressor 1 works in such a manner as to evaporate liquid refrigerant that can be unintentionally suctioned into the compressor 1, and thus is also effective to obtain a quality system in which problems such as insufficient lubrication are unlikely to occur.

Modification

There are two conditions for maximizing the current, which are a state of delayed power factor and a state of advanced power factor. Expression 1 described above is a condition to be used when the operation is performed in the state of delayed power factor. The refrigerating and air-conditioning apparatus 100 according to Modification is different from that according to Embodiment 1 in that the temporary heating excitation current command Idm0* is calculated based on Expression 2 below. Expression 2 is a condition to be used when the operation is performed in the state of advanced power factor.

$$-Idm0^* = \sqrt{Imax^2 - Iq^{*2}}$$ [Expression 2]

In the method based on Expression 1, the density of magnetic flux generated in the motor 11 is increased, and this helps increase the iron loss in the motor 11. This makes it possible to achieve more effective heating. Further, in the method based on Expression 2, the output voltage of the inverter 20 is decreased. Thus, this method is effective in a case where it is difficult to increase the output voltage, for example, when the compressor 1 is operated at an increased rotational velocity.

Further, either the method based on Expression 1 according to Embodiment 1 or the method based on Expression 2 according to Modification can be used by switching between them in response to the rotation speed of the compressor 1 or the output voltage.

In the refrigerating and air-conditioning apparatus 100 according to Embodiment 1 described above, when the temperature of the compressor 1 becomes equal to or lower than a predetermined value during the defrosting operation, the heat generation control unit 21 executes the temperature control intended to increase the temperature of the compressor 1, so that the temperature of refrigerant discharged from the compressor 1 decreases moderately. Therefore, the refrigerating and air-conditioning apparatus 100 can finish the defrosting operation performed on the first heat exchanger 2 earlier, and reduce the time period during which the second heat exchanger 4 has a reduced heating capacity after the defrosting operation, thereby achieving the operation that is comfortable for the users. The temperature of the compressor 1 can be detected by using the temperature sensor 30 installed in the compressor 1 as standard equipment without the need for additional parts. For this reason, the effect of reducing the time period, during which the heating capacity is reduced due to the defrosting operation, can be obtained at low costs. The temperature of the compressor 1 is maintained not to be decreased, so that when liquid refrigerant is unintentionally suctioned into the compressor 1, this maintained temperature works in such a manner as to evaporate the liquid refrigerant. Consequently, a quality system can be obtained in which problems such as insufficient lubrication are unlikely to occur. In addition, the overall capacity during the heating operation is evaluated based on the average integrated capacity of the refrigerating and air-conditioning apparatus 100, including the defrosting time. Thus, the effect of reducing the defrosting time leads to improvement in the heating capacity. In addition, since the temperature of the compressor 1 is varied within a narrow range in the cycles of heating operation and defrosting operation, heat stress exerted on the compression mechanism is lessened and the reliability for protecting against metal fatigue improves.

There is a case where the inverter 20 provided with the heat generation control unit 21 is installed in the compressor 1 as standard equipment. In that case, since additional parts are unnecessary, the refrigerating and air-conditioning apparatus 100 that can reduce the time period, during which the heating capacity is reduced due to the defrosting operation, can be obtained at low costs. The heat generation control unit 21 provided in the inverter 20 can increase the temperature of the compressor 1, so that this reduces the time period for which the refrigerating and air-conditioning apparatus 100 has insufficient heating capacity during the defrosting operation and at the start of heating operation. This results in improvement in the users' comfort.

The heat generation control unit 21 executes the loss control intended to increase the loss of the motor 11, so that the motor 11 generates heat, which can moderate the decrease in temperature of refrigerant discharged from the compressor 1. There is a case where the inverter 20 is installed in the compressor 1 as standard equipment. In that case, since additional parts are unnecessary, the refrigerating and air-conditioning apparatus 100 that can reduce the time period, during which the heating capacity is reduced due to the defrosting operation, can be obtained at low costs.

The heat generation control unit 21 uses the current value of the motor 11 as a controlled variable. The control which is normally executed by the inverter 20 can also be applied to the compressor 1 to increase its temperature and thus reduce the time period during which the heating capacity is reduced.

The heat generation control unit 21 is activated using the excitation current command Id* for the motor 11 as a controlled variable. The control is which normally executed by the inverter 20 can also be applied to the compressor 1 to increase its temperature and thus reduce the time period during which the heating capacity is reduced.

Since the heat generation control unit 21 is also activated at the start of heating operation after the defrosting operation ends, the preheating time after the defrosting operation is reduced. Consequently, the refrigerating and air-conditioning apparatus 100 can achieve the operation that is comfortable for the users.

The temperature sensor 30 configured to measure the temperature of the compressor 1 is located at the discharge port 1a of the compressor 1. Therefore, the temperature sensor 30 quickly measures the change in temperature of the compressor 1 to control heat generation. This control can reduce the time period during which the heating capacity is reduced due to the defrosting operation. Consequently, the refrigerating and air-conditioning apparatus 100 can achieve the operation that is comfortable for the users.

Embodiment 2

Configuration of Refrigerating and Air-Conditioning Apparatus

Figure 9:
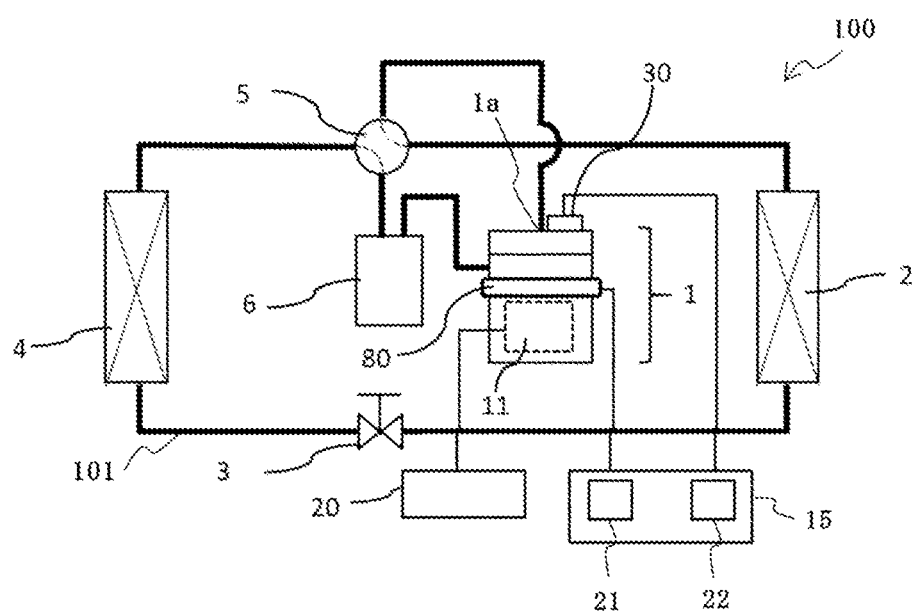
FIG. 9 is a circuit configuration diagram of a refrigerating and air-conditioning apparatus according to Embodiment 2.

FIG. 9 is a circuit configuration diagram of the refrigerating and air-conditioning apparatus 100 according to Embodiment 2. Embodiment 2 is different in configuration from Embodiment 1 in that the compressor 1 is heated. In Embodiment 2, the components in common with Embodiment 1 are denoted by the same reference signs, and thus descriptions thereof are omitted. The differences from Embodiment 1 are mainly described below. The heat generation control unit 21 in Embodiment 2 is different in that it controls a heater 80 attached to the compressor 1 from the heat generation control unit 21 configured to control the motor 11 in Embodiment 1.

As illustrated in FIG. 9, the refrigerating and air-conditioning apparatus 100 according to Embodiment 2 has the heater 80 attached to the compressor 1 to prevent liquid refrigerant from accumulating in the compressor 1 during the stop of operation. The heating amount by the heater 80 is controlled by the heat generation control unit 21 in the controller 15.

Figure 10:
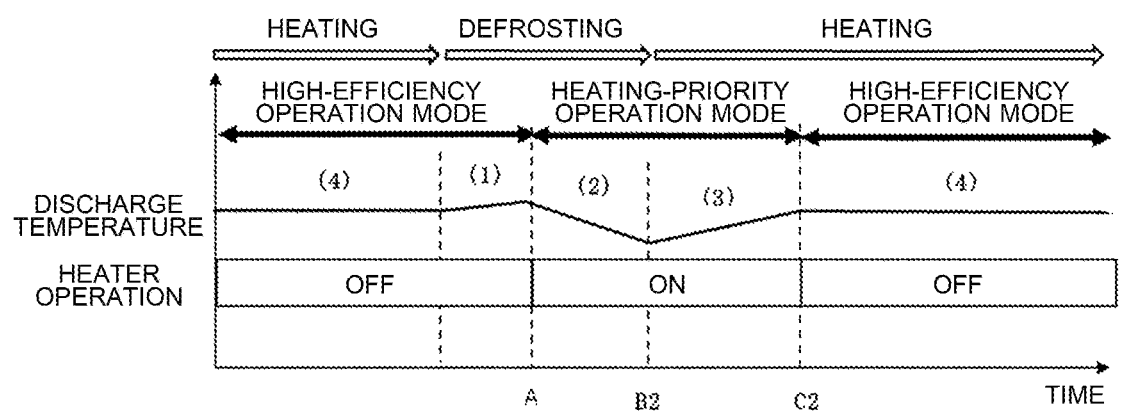
FIG. 10 is a graph showing the relationship between the discharge temperature in a compressor, the current in the compressor, and the time in the refrigerating and air-conditioning apparatus according to Embodiment 2.

FIG. 10 is a graph showing the relationship between the discharge temperature Td in the compressor 1, the current in the compressor 1, and the time in the refrigerating and air-conditioning apparatus 100 according to Embodiment 2. FIG. 10 shows the operation state of the refrigerating and air-conditioning apparatus 100 according to Embodiment 2 during the heating operation, the defrosting operation, and back to the heating operation. In FIG. 10, the vertical axis represents the discharge temperature and ON/OFF of the heater operation, while the horizontal axis represents time. In FIG. 10, the solid line illustrates the discharge temperature in the compressor 1, and the dotted line illustrates the compressor current.

As illustrated in FIG. 10, the refrigerating and air-conditioning apparatus 100 operates in the high-efficiency operation mode that is a normal mode during the heating operation in the same manner as in Embodiment 1. In the refrigerating and air-conditioning apparatus 100, after the start of defrosting operation, when a decrease in the value measured by the temperature sensor 30 is detected during the defrosting operation performed on the first heat exchanger 2, then the mode determination unit 22 issues a MODE signal in which the heating-priority operation mode is defined to the heat generation control unit 21. The heat generation control unit 21 increases the heat generation amount in the heater 80 attached to the compressor 1 to increase the temperature of the compressor 1.

As illustrated in FIG. 10, the refrigerating and air-conditioning apparatus 100 operates in the high-efficiency operation mode that is a normal mode during the heating operation in the same manner as in Embodiment 1. At the point A after section (1) of FIG. 10 has elapsed since the start of defrosting operation, the discharge temperature in the compressor 1 becomes equal to or lower than a predetermined value. At this point A, the controller 15 starts the heating-priority operation mode.

In section (2) of FIG. 10, the defrosting operation is performed in a state in which the discharge temperature in the compressor 1 decreases minimally by a heating control in which the heater 80 heats the compressor 1. This reduces the time in sections (1) and (2) of FIG. 10 during which the defrosting operation is performed, compared to Comparative Example in FIG. 6.

After the defrosting operation has finished, the operation is switched to the heating operation at the point B2 of FIG. 10. Even though the heating operation is restarted in section (3) of FIG. 10, the heating-priority operation mode by using the heater 80 is still continued.

Thereafter, when the controller 15 confirms that the discharge temperature Td in the compressor 1 has recovered to the normal level, then at the point C2 of FIG. 10, a mode switching instruction to switch from the heating-priority operation mode to the high-efficiency operation mode is issued to switch the operation to the high-efficiency operation mode.

This reduces the time in section (3) of FIG. 10 that is the preheating time after the defrosting operation compared to Comparative Example in FIG. 6. As described above, also in the refrigerating and air-conditioning apparatus 100 in Embodiment 2, the discharge temperature Td in the compressor 1 decreases minimally during the defrosting operation and at the start of heating operation, and the time period from the defrosting operation to the heating operation until the start of normal operation is reduced. This allows the refrigerating and air-conditioning apparatus 100 in Embodiment 2 to achieve the operation that is comfortable for the users.

In the refrigerating and air-conditioning apparatus 100 according to Embodiment 2 described above, the heater 80 attached to the compressor 1 heats the compressor 1. This allows the temperature of refrigerant discharged from the compressor 1 to decrease moderately. There is a case where the heater 80 is installed in the compressor 1 as standard equipment. In that case, since additional parts are unnecessary, the refrigerating and air-conditioning apparatus 100 that can reduce the time period, during which the heating capacity is reduced due to the defrosting operation, can be obtained at low costs.

REFERENCE SIGNS LIST

1: compressor, 1a: discharge port, 2: first heat exchanger, 3: expansion device, 4: second heat exchanger, 5: four-way valve, 6: accumulator, 11: motor, 11a: contact surface, 15: controller, 20: inverter, 21: heat generation control unit, 22: mode determination unit, 30: temperature sensor, 40: power conversion unit, 41: control circuit, 42*a*: current sensor, 42*b*: current sensor, 50: dq conversion unit, 51: position and velocity estimation unit, 52: velocity control unit, 53: excitation-current command generation unit, 54: current control unit, 55: inverse dq conversion unit, 60: high-efficiency control unit, 61: selector, 70: upper-limit current calculation unit, 71: limiter, 80: heater, 100: refrigerating and air-conditioning apparatus, 101: pipe

The invention claimed is:

1. A refrigerating and air-conditioning apparatus comprising:
   a refrigerant circuit in which a compressor having a built-in motor, a first heat exchanger, an expansion device, a second heat exchanger, and a four-way valve are connected to each other by pipes to allow refrigerant to circulate through the refrigerant circuit;
   a temperature sensor configured to measure a temperature of the compressor;
   an inverter configured to control the motor, and
   a heat generation control unit being provided in the inverter and configured to
   increase a temperature of the compressor when the heat generation control unit detects a decrease in a value measured by the temperature sensor during a defrosting operation performed on the first heat exchanger, and
   use a value of an excitation-current command for the motor as a controlled variable, and generate a negative excitation-current command.

2. The refrigerating and air-conditioning apparatus of claim 1, wherein when a value measured by the temperature sensor becomes equal to a value measured by the temperature sensor and detected before a start of the defrosting operation performed on the first heat exchanger, the heat generation control unit stops a temperature control to increase a temperature of the compressor.

3. The refrigerating and air-conditioning apparatus of claim 1, wherein the motor has a contact surface in contact with the pipes in which the refrigerant flows.

4. The refrigerating and air-conditioning apparatus of claim 1, wherein the heat generation control unit increases a loss in the motor to increase a temperature of the compressor.

5. The refrigerating and air-conditioning apparatus of claim 1, wherein the motor has a relationship between a winding resistance $R[\Omega]$ a rated input $P[W]$, and a rated current $I[A]$, the relationship satisfying $0.001 < (3*I*I*R)/P$.

6. The refrigerating and air-conditioning apparatus of claim 1, wherein the heat generation control unit increases a temperature of the compressor at a start of a heating operation.

7. The refrigerating and air-conditioning apparatus of claim 1, wherein the temperature sensor is located at a discharge port of the compressor.

8. The refrigerating and air-conditioning apparatus of claim 1,
   wherein the heat generation control unit is configured to
      start control to increase the temperature of the compressor when detecting that the measured value of the temperature sensor starts to decrease in the defrosting operation of the first heat exchanger, and
      stop, after the defrosting operation of the first heat exchanger, the control to increase the temperature of the compressor when a value measured by the temperature sensor becomes equal to a value measured by the temperature sensor and detected before a start of the defrosting operation performed on the first heat exchanger.

9. The refrigerating and air-conditioning apparatus of claim 1, wherein the heat generation control unit is configured to continue the control to increase the temperature of the compressor when operation is switched from a heating operation to the defrosting operation and while the measured value of the temperature sensor does not decrease.

* * * * *